United States Patent
Liang

(10) Patent No.: US 12,177,560 B2
(45) Date of Patent: Dec. 24, 2024

(54) CONTROL CIRCUIT FOR CONTROLLING IMAGE SENSOR TO STOP GENERATING A DRIVING POWER

(71) Applicant: HIMAX TECHNOLOGIES LIMITED, Tainan (TW)

(72) Inventor: Shu-Chang Liang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 176 days.

(21) Appl. No.: 18/173,804

(22) Filed: Feb. 24, 2023

(65) Prior Publication Data
US 2024/0292094 A1 Aug. 29, 2024

(51) Int. Cl.
*H04N 5/335* (2011.01)
*G06F 9/30* (2018.01)
*G06F 9/48* (2006.01)
*H04N 23/65* (2023.01)

(52) U.S. Cl.
CPC ....... *H04N 23/651* (2023.01); *G06F 9/30083* (2013.01); *G06F 9/4812* (2013.01)

(58) Field of Classification Search
CPC .................................................. H04N 23/651
See application file for complete search history.

(56) References Cited

U.S. PATENT DOCUMENTS

| | | |
|---|---|---|
| 5,648,799 A | 7/1997 | Kikinis |
| 9,832,379 B1 | 11/2017 | Neglur |
| 11,134,194 B2 | 9/2021 | Lin |
| 2017/0310875 A1* | 10/2017 | Kiso ................. H04N 23/651 |
| 2019/0373170 A1* | 12/2019 | Fujita ................. G06T 3/4038 |
| 2022/0353411 A1 | 11/2022 | Kim et al. |
| 2024/0114235 A1* | 4/2024 | Gallagher .......... H04N 23/20 |

OTHER PUBLICATIONS

"Office Action of Taiwan Counterpart Application", issued on Jun. 18, 2024, pp. 1-17.

* cited by examiner

*Primary Examiner* — Gary C Vieaux
(74) *Attorney, Agent, or Firm* — JCIPRNET

(57) ABSTRACT

The control circuit for controlling an image sensor of the disclosure includes a processor, a command circuit, a power management circuit and an image controller. The image sensor captures at least one image and generates at least one image data corresponding the at least one image in response to the controlling command. The power management circuit generates a driving power in response to a timing interrupt signal when the processor is in a low power mode. The command circuit is driven by the driving power when the processor is in the low power mode. The image controller is driven by the driving power to controls the command circuit to generate the controlling command when the processor is in the low power mode. The image controller controls the power management circuit to stop generating the driving power according to a data number of the at least one image data.

10 Claims, 4 Drawing Sheets

CONTROL CIRCUIT FOR CONTROLLING IMAGE SENSOR TO STOP GENERATING A DRIVING POWER

BACKGROUND

Technical Field

The disclosure generally relates to a control circuit, and more particularly to a control circuit for controlling an image sensor.

Description of Related Art

Generally, an image sensor may be controlled by a controller. When controlling the image sensor, the controller must be in an operating mode. Therefore, when controlling the image sensor, the controller has large power consumption. Thus, how to decrease the power consumption of the controller is one of the research and development focuses of those skilled in the art.

SUMMARY

The disclosure provides a control circuit has low power consumption for controlling an image sensor.

The control circuit for controlling an image sensor of the disclosure includes a processor, a command circuit, a power management circuit and an image controller. The command circuit is coupled to the processor and the image sensor. The processor controls the command circuit to generate a controlling command when the processor is in an operating mode. The image sensor captures at least one image and generates at least one image data corresponding the at least one image in response to the controlling command. The power management circuit is coupled to the command circuit. The power management circuit generates a driving power in response to a timing interrupt signal when the processor is in a low power mode. The command circuit is driven by the driving power when the processor is in the low power mode. The image controller is coupled to the image sensor, the power management circuit and the command circuit. The image controller is driven by the driving power to controls the command circuit to generate the controlling command when the processor is in the low power mode. The image controller controls the power management circuit to stop generating the driving power according to a data number of the at least one image data.

Based on the above, when the processor is in the low power mode, the power management circuit generates the driving power in response to the timing interrupt signal. The image controller is driven to controls the command circuit to generate the controlling command. In other words, the control circuit controls the image sensor when the processor is in the low power mode. Besides, the image controller controls the power management circuit to stop generating the driving power according to a data number of the at least one image data. Therefore, the control circuit of the disclosure has low power consumption for controlling an image sensor.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being "coupled to", "connected to", or "conducted to" another element, it may be directly connected to the other element and established directly electrical connection, or intervening elements may be presented therebetween for relaying electrical connection (indirectly electrical connection). In contrast, when an element is referred to as being "directly coupled to", "directly conducted to", or "directly connected to" another element, there are no intervening elements presented.

Figure 1:
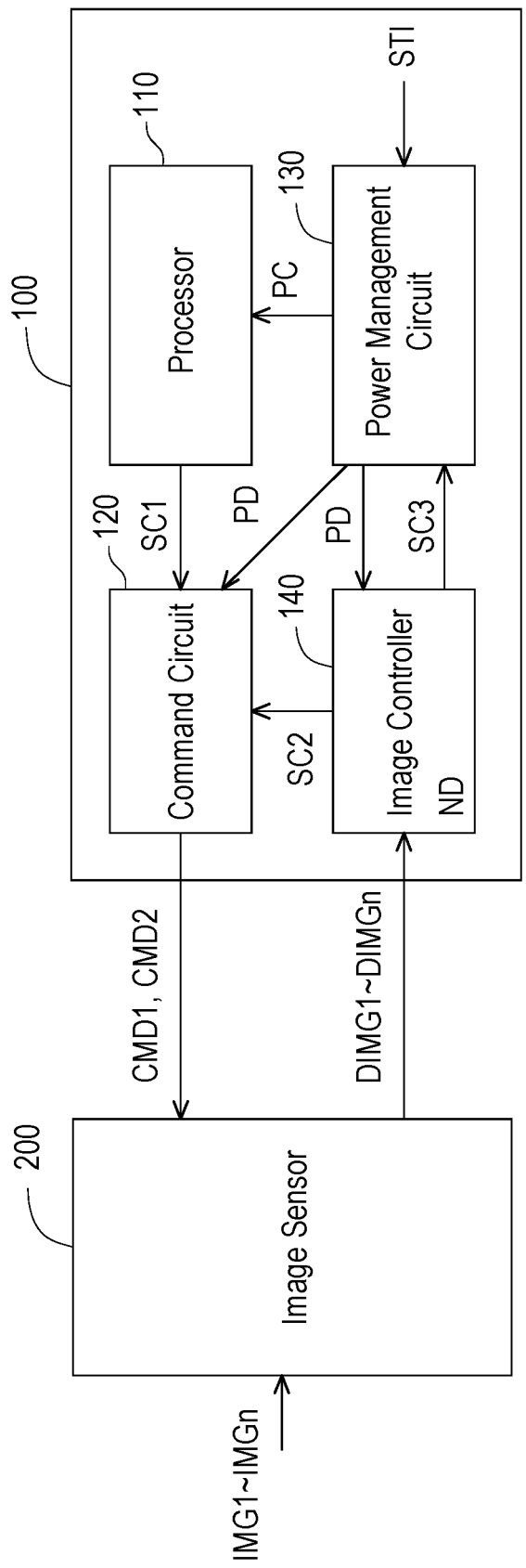
FIG. 1 illustrates a schematic diagram of a control circuit and an image sensor according to a first embodiment of the disclosure.

FIG. 1 illustrates a schematic diagram of a control circuit and an image sensor according to a first embodiment of the disclosure. Please refer to FIG. 1, in the embodiment, the control circuit 100 is used to control the image sensor 200. The control circuit 100 includes a processor 110, a command circuit 120, a power management circuit 130 and an image controller 140. The command circuit 120 is coupled to the processor 110 and the image sensor 200. The image sensor 200 captures images IMG1~IMGn and generates image data DIMG1~DIMGn corresponding the images IMG1~IMGn in response to a controlling command CMD1.

The processor 110 controls the command circuit 120 when the processor 110 is in an operating mode. Therefore, the command circuit 120 is controlled to generate the controlling command CMD1 by the processor 110. For example, the processor 110 provides a control signal SC1. The command circuit 120 generates the controlling command CMD1 in response to the control signal SC1.

The power management circuit 130 is coupled to the processor 110, the command circuit 120 and the image controller 140. When the processor 110 is in the operating mode, the power management circuit 130 generates a driving power PC and a driving power PD. The power management circuit 130 provides the driving power PC to the processor 110 and provides the driving power PD to drive the command circuit 120 and the image controller 140.

In the embodiment, when the processor 110 is in a low power mode, the power management circuit 130 generates the driving power PD in response to a timing interrupt signal STI and provides the driving power PD to the command circuit 120 and the image controller 140. when the processor 110 is in a low power mode, the power management circuit 130 stops generating the driving power PC. Therefore, the processor 110 does not operate in a low power mode.

In the embodiment, when the processor 110 is in a low power mode, the power management circuit 130 drives the command circuit 120 and the image controller 140 by the driving power PD in response to the timing interrupt signal STI. When the processor 110 is in the low power mode, the image controller 140 is driven by the driving power PD to controls the command circuit 120 to generate the controlling command CMD1. For example, when the processor 110 is in the low power mode, the image controller 140 provides a control signal SC2. The command circuit 120 generates the controlling command CMD1 in response to the control signal SC2. In other words, when the processor 110 is in the low power mode, the command circuit 120 is still active to command the image sensor 200 to captures the images IMG1~IMGn based on a timing of the timing interrupt signal STI.

In the embodiment, a power consumption of the control circuit 100 when the processor 110 is in a low power mode is lower than a power consumption of the control circuit 100 when the processor 110 is in the operating mode.

In the embodiment, the image controller 140 receives the image data DIMG1~DIMGn. The image controller 140 controls the power management circuit 130 to stop generating the driving power PD according to a data number ND of the image data DIMG1~DIMGn.

It should be noted, when the processor 110 is in the low power mode, the power management circuit 130 generates the driving power PD in response to the timing interrupt signal STI. The image controller 140 is driven to controls the command circuit 120 to generate the controlling command CMD1. In other words, the control circuit 100 controls the image sensor 200 when the processor 100 is in the low power mode. Besides, the image controller 140 controls the power management circuit 130 to stop generating the driving power PD according to a data number ND of the image data DIMG1~DIMGn. Therefore, the control circuit of the disclosure has low power consumption for controlling an image sensor.

In the embodiment, the processor 110 sets the data number ND before entering low power mode and provides the data number ND to the image controller 140. The image controller 140 determines one of the image data DIMG1~DIMGn is a last image data in a period according to the data number ND. When the last image data is determined, the image controller 140 controls the power management circuit 130 to stop generating the driving power PD.

For example, when the last image data is determined, the image controller 140 provides a control signal SC3. The power management circuit 130 stop generating the driving power PD in response to the control signal SC3.

For example, the processor 110 sets the data number ND as "5", the disclosure is not limited thereto. The image controller 140 may determine the image data DIMG5 is the last image data. Therefore, the image controller 140 controls the power management circuit 130 to stop generating the driving power PD. Besides, when the last image data is determined, the image controller 140 controls the command circuit 120 to generate a finishing command CMD2 to the image sensor 200. Therefore, the image sensor 200 stops capturing at least one image in response to the finishing command CMD2.

In the embodiment, the processor 110 may be a central processing unit (CPU) or other programmable general-purpose or specific-purpose microprocessor, digital signal processor (DSP), programmable controller, application specific integrated circuit (ASIC), programmable logic device (PLD), other similar devices, or a combination thereof. The control circuit 110 is capable of loading and executing a computer program to complete a corresponding operational function. In an embodiment, the control circuit 110 may also achieve various operational functions through implementation of hardware circuits, and sufficient teaching, suggestions, and implementation details about the detailed steps and implementation are already provided in the common knowledge of the field.

In the embodiment, the image sensor 200 may be an infrared image sensor or a visible light image sensor. Therefore, the images IMG1~IMGn may be infrared images or visible light images, the disclosure is not limited thereto.

In some embodiments, the image sensor 200 may capture only the image IMG1 based on a timing of the timing interrupt signal STI, the disclosure is not limited thereto. In the disclosure the image sensor 200 captures one or more images.

Figure 2:
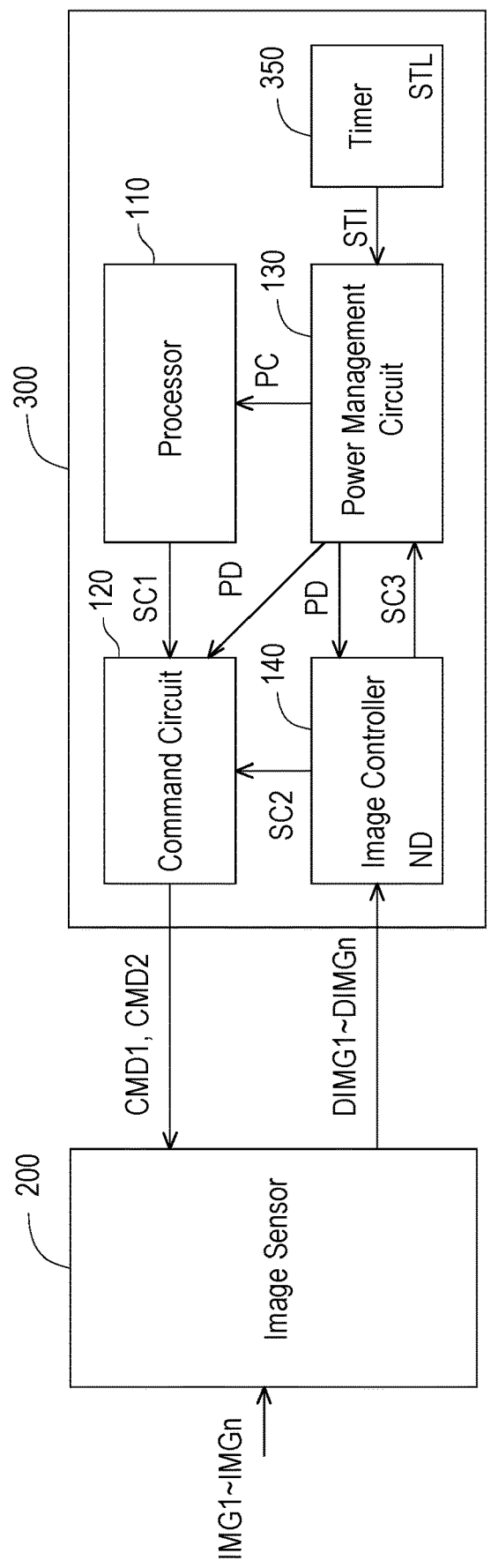
FIG. 2 illustrates a schematic diagram of a control circuit and an image sensor according to a second embodiment of the disclosure.

FIG. 2 illustrates a schematic diagram of a control circuit and an image sensor according to a second embodiment of the disclosure. Please refer to FIG. 2, in the embodiment, the control circuit 300 is used to control the image sensor 200. The control circuit 300 includes the processor 110, the command circuit 120, the power management circuit 130 and the image controller 140 and a timer 350. Detail operations of the processor 110, the command circuit 120, the power management circuit 130 and the image controller 140 may be sufficiently taught in the embodiment in FIG. 1 and are not repeated herein.

In the embodiment, the timer 350 is coupled to the power management circuit 130. The timer 350 provides the timing interrupt signal STI based on a setting time length STL when the processor 110 is in the low power mode.

Figure 3:
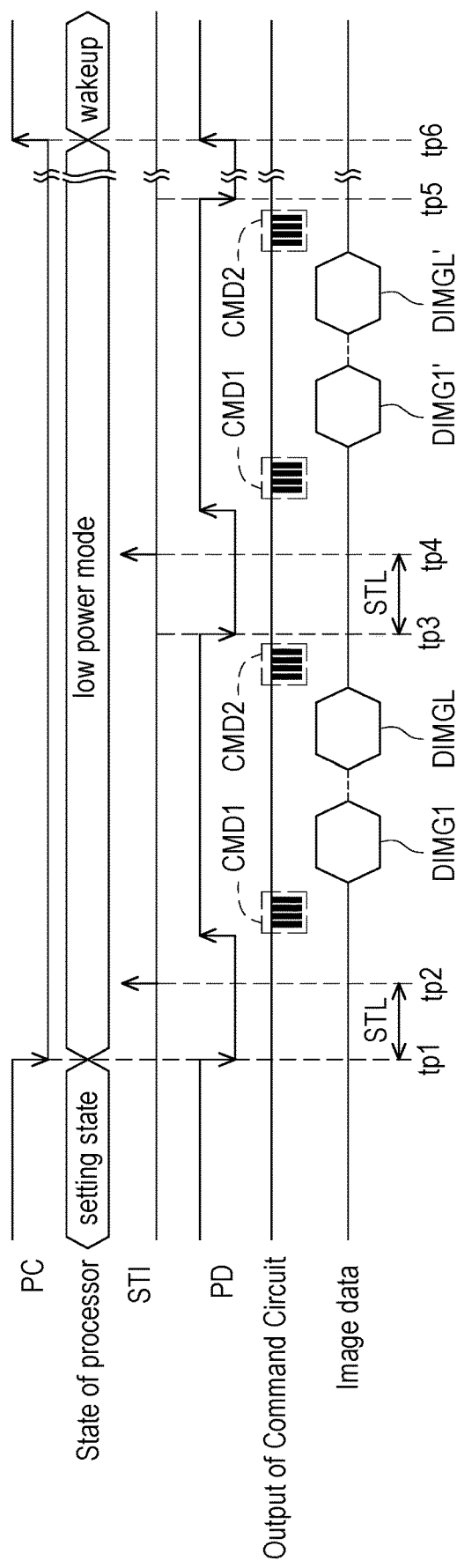
FIG. 3 illustrates an operation timing diagram according to an embodiment of the disclosure.

Detaily, please refer to FIG. 2 and FIG. 3, FIG. 3 illustrates an operation timing diagram according to an embodiment of the disclosure. In the embodiment, the processor 110 sets the setting time length STL before entering low power mode. For example, in the operating mode, the processor 110 sets the setting time length STL and provides the setting time length STL to the timer 350 in a setting stage before entering the low power mode. In the low power mode, the processor 110 is in a sleep state or power-down state.

At a time point tp1, the power management circuit 130 may be disable and stops generating the driving powers PD and PC. The processor 110 does not receive the driving power PC and then enters the low power mode. Besides, the command circuit 120 and the image controller 140 does not receive the driving power PD at the time point tp1. At the time point tp1, the timer 350 starts timing operation. When the timing time length reaches the setting time length STL, the timer 350 generates the timing interrupt signal STI at a time point tp2. For example, the timing interrupt signal STI may be a pulse for triggering the power management circuit 130, the disclosure is not limited thereto. Therefore, after the time point tp2, the power management circuit 130 is enabled to generate the driving power PD to drive the command circuit 120 and the image controller 140. The command circuit 120 and the image controller 140 are also enabled.

After the time point tp2, the command circuit 120 provides the controlling command CMD1 to the image sensor 200. The image sensor 200 captures images IMG1~IMGn and generates image data DIMG1~DIMGn. The image controller 140 determines the last image data DIMGL in the period (between the time point tp2 and a time point tp3) according to the data number ND and then controls the command circuit 120 to generate a finishing command CMD2 to the image sensor 200. Therefore, the image sensor 200 stops capturing at least one image in response to the finishing command CMD2. After the image sensor 200 stops the capturing operation, the power management circuit 130 stops generating the driving power PD at the time point tp3.

The timer 350 starts timing operation again at the time point tp3. When the timing time length reaches the setting time length STL, the timer 350 generates the timing interrupt signal STI at a time point tp4. Therefore, the power management circuit 130 generates the driving power PD to drive the command circuit 120 and the image controller 140. The command circuit 120 and the image controller 140 are enabled again.

The command circuit 120 provides the controlling command CMD1 to the image sensor 200. The image sensor 200 generates image data DIMG1'~DIMGL'. The image controller 140 determines the last image data DIMGL' and then controls the command circuit 120 to generate a finishing command CMD2 to the image sensor 200. Therefore, the image sensor 200 stops capturing at least one image in response to the finishing command CMD2. After the image sensor 200 stops the capturing operation, the power management circuit 130 stops generating the driving power PD at a time point tp5.

At a time point tp6, the driving power PC and the driving power PD are provided. Therefore, the processor 110 is waked-up from the low power mode to the operating mode.

In the embodiment, the timer 350 stops providing the timing interrupt signal STI when the processor 110 is in an operating mode.

In some embodiments, when the processor 110 is in the operating mode, the timer 350 still provides the timing interrupt signal STI. However, when the processor 110 is in the operating mode, the power management circuit generates the driving power PD and ignores the timing interrupt signal STI.

In the embodiment, the timer 350 provides the timing interrupt signal STI two times in single low power mode. In some embodiments, the timer 350 may provide the timing interrupt signal STI at least one time in single low power mode.

Figure 4:
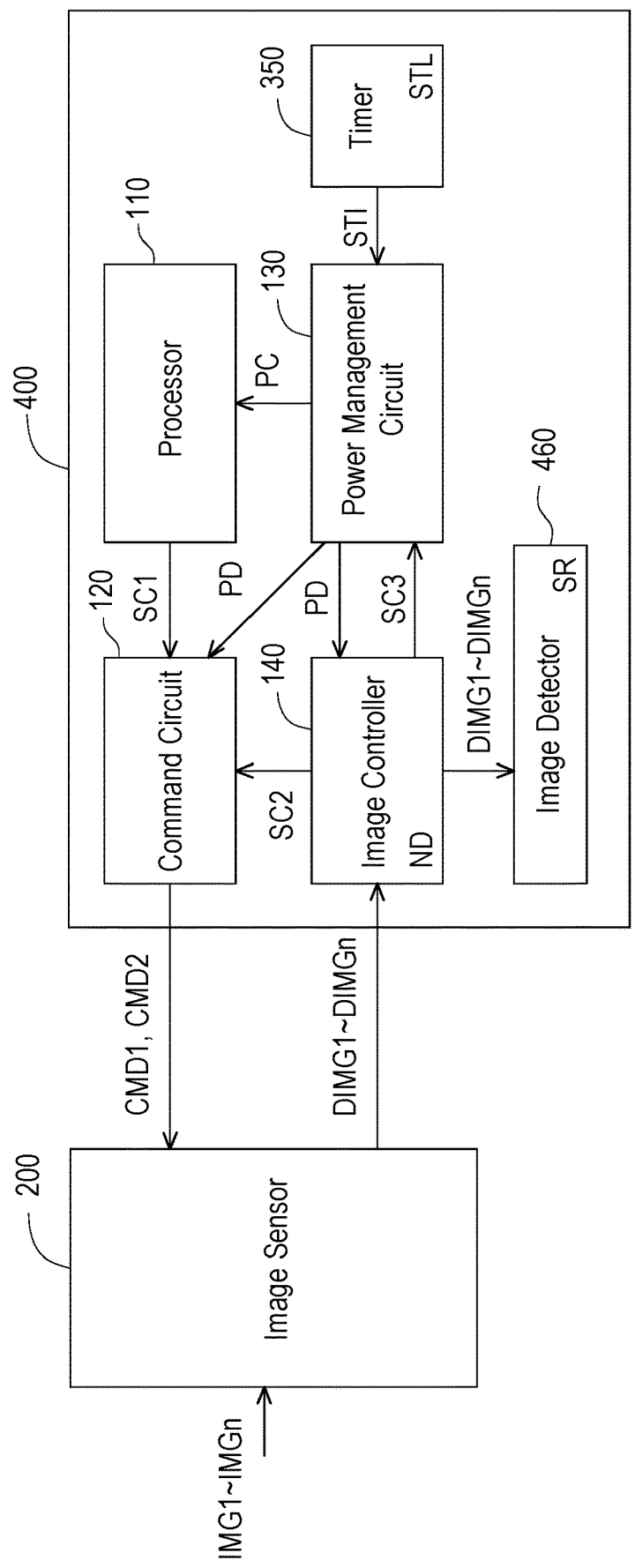
FIG. 4 illustrates a schematic diagram of a control circuit and an image sensor according to a third embodiment of the disclosure.

FIG. 4 illustrates a schematic diagram of a control circuit and an image sensor according to a third embodiment of the disclosure. Please refer to FIG. 4, in the embodiment, the control circuit 400 includes the processor 110, the command circuit 120, the power management circuit 130 and the image controller 140, the timer 350 and an image detector 460. Detail operations of the processor 110, the command circuit 120, the power management circuit 130, the image controller 140 and the timer 350 may be sufficiently taught in the embodiment in FIGS. 1 to 3 and are not repeated herein.

In the embodiment, the image detector 460 is coupled to the image controller 140. the image detector 460 generates a determine result signal SR according to the image data DIMG1~DIMGn. The image detector 460 receives the image data DIMG1~DIMGn through the image controller 140. The image detector 460 generates a determine result signal SR according to contents of the image data DIMG1~DIMGn and/or changes between the image data DIMG1~DIMGn. When the determine result signal SR meets at least one preset condition, the image detector 460 wakes up the processor 110 in the low power mode. Therefore, the processor 110 operates in operating mode.

For example, when the processor 110 is in the low power mode, the image detector 460 determines that the image data DIMG1~DIMGn are identical. There is no any motion in a field monitored by the image sensor 200. Therefore, the image detector 460 determines that the field is static. The image detector 460 does not wake up the processor 110 in the low power mode.

For example, when the processor 110 is in the low power mode, the image detector 460 determines that the image data DIMG1~DIMGn are different. Therefore, the image detector 460 determines that there is at least one motion in the field. The image detector 460 wakes up the processor 110 in the low power mode.

For example, when the processor 110 is in the low power mode, the image detector 460 determines that the image data DIMG1~DIMGn are different. Therefore, the image detector 460 determines that there is at least one motion in the field. Besides, the image detector 460 identifies a motion object. For example, if the motion object includes human, the image detector 460 wakes up the processor 110 in the low power mode. For example, if the motion object does not include human, the image detector 460 does not wake up the processor 110 in the low power mode.

For example, when the processor 110 is in the low power mode, the image detector 460 determines that the image data DIMG1~DIMGn are different. Therefore, the image detector 460 determines that there is at least one motion in the field. Besides, the image detector 460 identifies a motion object. For example, if the motion object includes human unfamiliar to the user, the image detector 460 wakes up the processor 110 in the low power mode. For example, if the motion object includes a human familiar to the user, the image detector 460 does not wake up the processor 110 in the low power mode.

In view of the foregoing, the control circuit includes the processor, the command circuit, the power management circuit and the image controller. When the processor is in the low power mode, the power management circuit generates the driving power in response to the timing interrupt signal. The image controller is driven to controls the command circuit to generate the controlling command. In other words, the control circuit controls the image sensor when the processor is in the low power mode. Besides, the image controller controls the power management circuit to stop generating the driving power according to a data number of the at least one image data. Therefore, the control circuit of the disclosure has low power consumption for controlling an image sensor when the processor is in the low power mode. Besides, the control circuit further includes the image detector. The image detector generates the determine result signal according to the at least one image data and wakes up the processor when the determine result signal meets the at least one preset condition.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control circuit for controlling an image sensor, comprising:
    a processor;
    a command circuit, coupled to the processor and the image sensor, wherein the processor controls the command circuit to generate a controlling command when the processor is in an operating mode, wherein the image sensor captures at least one image and generates at least one image data corresponding the at least one image in response to the controlling command;
    a power management circuit, coupled to the command circuit, configured to generate a driving power in response to a timing interrupt signal when the processor is in a low power mode, wherein the command circuit is driven by the driving power when the processor is in a low power mode; and
    an image controller, coupled to the image sensor, the power management circuit and the command circuit, configured to be driven by the driving power to controls the command circuit to generate the controlling command when the processor is in the low power mode,
    wherein the image controller controls the power management circuit to stop generating the driving power according to a data number of the at least one image data.

2. The control circuit of claim 1, further comprising:
    a timer, coupled to the power management circuit, configured to provide the timing interrupt signal based on a setting time length when the processor is in the low power mode.

3. The control circuit of claim 2, wherein the processor sets the setting time length before entering the low power mode.

4. The control circuit of claim 2, wherein the timer stops providing the timing interrupt signal when the processor is in an operating mode.

5. The control circuit of claim 1, wherein the power management circuit generates the driving power and ignores the timing interrupt signal when the processor is in the operating mode.

6. The control circuit of claim 1, wherein:
    the image controller determines one of the at least one image data is a last image data in a period according to the data number,
    when the last image data is determined, the image controller controls the power management circuit to stop generating the driving power.

7. The control circuit of claim 6, wherein:
    when the last image data is determined, the image controller controls the command circuit to generate a finishing command to the image sensor, and
    the image sensor stops capturing at least one image in response to the finishing command.

8. The control circuit of claim 1, wherein the processor sets the data number before entering the low power mode.

9. The control circuit of claim 1, further comprising:
    an image detector, coupled to the image controller, configured to generate a determine result signal according to the at least one image data.

10. The control circuit of claim 9, wherein when the determine result signal meets at least one preset condition, the image detector wakes up the processor in the low power mode.

* * * * *